United States Patent [19]

Newman

[11] Patent Number: 5,324,988

[45] Date of Patent: Jun. 28, 1994

[54] SYSTEM FOR UNDERSEA WAVE GENERATION OF ELECTRIC POWER

[76] Inventor: Edwin Newman, 10331 Lindley Ave. #113, Northridge, Calif. 91326

[21] Appl. No.: 95,223

[22] Filed: Jul. 23, 1993

[51] Int. Cl.⁵ ............................................. F03B 13/10
[52] U.S. Cl. ........................................ 290/54; 290/43; 415/7; 416/84
[58] Field of Search ........................ 290/42, 43, 53, 54; 415/7; 416/84

[56] References Cited

U.S. PATENT DOCUMENTS

| | | | |
|---|---|---|---|
| 4,026,587 | 5/1977 | Hultman et al. | 290/53 |
| 4,256,970 | 3/1981 | Tomassini | 290/53 |
| 4,383,182 | 5/1983 | Bowley | 290/43 |

OTHER PUBLICATIONS

Application 07/994302, Dec. 21, 1992 System for Undersea Generation of Electric Power.

Primary Examiner—A. D. Pellinen
Assistant Examiner—Robert Lloyd Hoover

[57] ABSTRACT

A system for generating electric power using undersea waves against a bag structure, mounted movably on a tower. The bag structure is made of large nylon bag, filled with compressed sea water and extending for 50 meters or more down, surrounding the support tower. Arranged around a central hole in the bag structure are located numerous generator pods which contain generator/rectifier/chopper sets. These generator pods have gears which mesh with racks mounted vertically around the tower periphery, and also with racks mounted horizontally around the bag structure central hole circumference. Movement of the undersea waves causes the bag to rotate and move vertically up and down the tower, turning the generator pod gears which turn AC alternators, producing electric power. A system as described in the invention, standing in 300 meters depth or more could produce over 50 megawatts electric power, cleanly and at an economic cost per kilowatt-hour.

8 Claims, 6 Drawing Sheets

SYSTEM FOR UNDERSEA WAVE GENERATION OF ELECTRIC POWER

BACKGROUND OF THE INVENTION

This invention relates to a system for generating electrical power from the motion of the sea, particularly utilizing undersea waves.

There have been published many articles and patents on methods and system for producing electrical power from the ocean waves. However, these have been concerned with using ocean surface waves. The equipment or floats for the equipment ride on the surface. Typical of these approaches are the systems described by Arlyn H. Jackson in U.S. Pat. No. 4,091,618 and Lawrence C. Burton in U.S. Pat. No. 4,931,662. Jackson's system utilizes a floating buoy attached to a pump which pumps water from a submerged tank below the float. The motion of the surface waves moves the buoy up and down, operating the pump to create a void in the submerged tank, thus creating a hydrostatic head. This hydrostatic head is used to drive a turbine and generate electric power.

The Burton patent describes a large circular float on the water surface which is attached to one end of a long, rigid beam. The Burton patent describes a large circular float on the water surface which is attached to one end of a long, rigid beam. The other end of the beam is supported and pivoted on a platform. The motion of the float, up and down, is transmitted to the platform where it can be used to pump hydraulic fluids and drive an electric generator.

Some of the more recent schemes have been described in the Los Angeles Times on Jun. 28, 1991. One is a system by Robert A. Bueker, who calls his system a Seamill. This is a device consisting of three 33 foot long pipes, one inside the other, that hold a small turbine driven by the ocean swells.

Another system by Stuart Pringle, illustrates a pier run out into the ocean. Suspended beneath the pier are vertical pistons which are connected to floats riding on the water surface. The pistons are moved up and down by the wave swells and compress air other fluid to drive turbine generators.

The incentive to produce the systems such as described above depends on the increasing public demand to use 'clean' non-polluting power generation, as well as a projected lower cost per kilowatt-hour. For example, according to Bueker, his Seamill can generate electricity at 1.5 to 3 cents a kilowatt-hour if sufficient surface wave energy is present. This compares with a Southern California Edison Co. cost averaging 3.6 cents a kilowatt-hour in 1990. There are, however, considerable political obstacles in the way of citing any significant shore-based system, such as described above, along the highly regulated shorelines of states, such as California. An off-shore system, using wave power, would reduce the political objections considerably.

Studies published in the Journal of Geophysical Research and other journals on oceanography, have revealed the existence of undersea internal waves occurring at various depths off the California coats. These waves have considerable and far more constant energy that surface waves, and could be harnessed to generate electrical power. It therefore would be new and useful to provide an off-shore system for generating electric power from undersea waves.

SUMMARY OF THE INVENTION

The system comprises a support tower on which is mounted a large cylindrically-shaped, water-filled bag incorporating electric generator pods in deep sea water.

The bag is located underwater at a predetermined depth and move up and down the tower as well as rotating about the tower, due to the impinging vertical and horizontal underwater wave velocities. Attached to the tower frame and running for more than the distance of the bags projected vertical movements, are located rigid, vertical rails. These rails support and interact with gears in the electric generator pods as the bag moves up and down, providing motive power to the generators. In addition, horizontal racks, located on the inside cylindrical wall of the bag, interact with gears in the electric generator pods, providing motive power as the bag rotates. A large number of generator pods are provided, the number depending on the size of the bag. These generators each produce AC electrical power which is then rectified to DC power in the pod, chopped, and combined on power buses for transmission by cables to a three-phase invertor located at the top of the tower. The inverter produces three-phase, 60 HZ power for transmission to the coast.

Accordingly, it is a principal object of the present invention to provide a system that utilizes deep underwater wave motion to generate large quantities of electric power.

Another object is to provide a sea wave-motion power generating system that will not impact unduly on highly regulated coastlines.

It is yet another object to provide a sea wave-motion power generating system which is capable of producing large quantities of electric power, cleanly and at low, cost relative to the presently available electrical power, cleanly and at low cost, relative to the presently available electrical power sources.

Further objects of the invention will become apparent from the study of the following portion of the specification, the claims and the attached drawings.

DESCRIPTION OF THE PREFERRED EMBODIMENT

The system comprises a bag structure 10 which is a large, cylindrically-shaped, water-filled bag shaped as an impulse turbine or impeller, centrally incorporating electric generator pods, and a support tower 1 for the bag mounted in deep sea water. The bag is shaped to also move up and down the tower structure. These bag movements cause gears in the generator pods to rotate, turning alternators and producing electric power.

Figure 1:
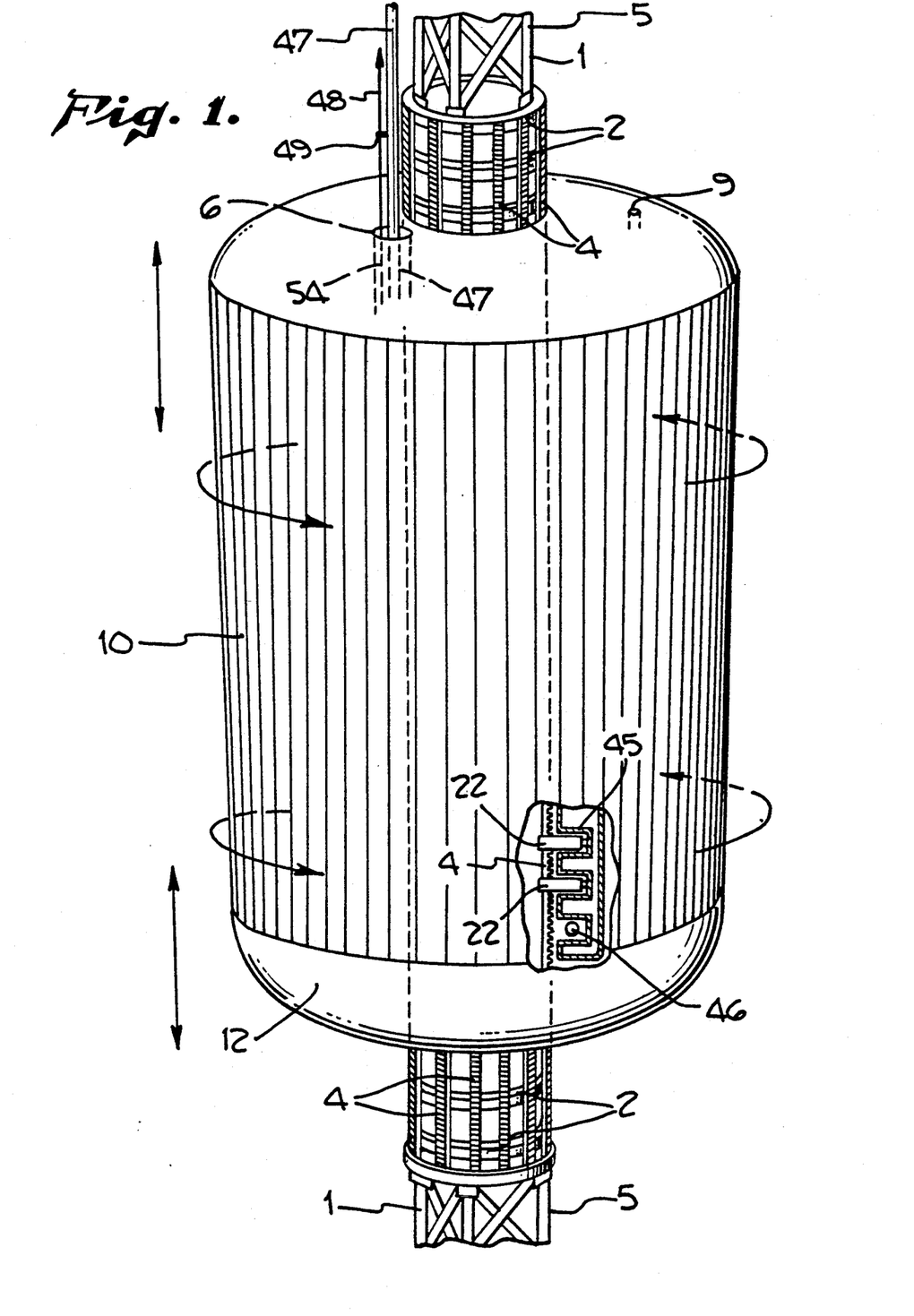
FIG. 1 is a perspective view of the present invention, particularly showing the bag of the system revolving around and moving up and down a portion of a tower under the sea surface; a cutaway shows two of the power generator pods next to a tower rail.

Referring to FIG. 1, there is shown a perspective view of an underwater generator system, mounted on a portion of a support tower 1. The tower 1 has a portion of its upper frame 5 adapted to support a large external structure such as the bag 10 underwater. Mounted to the tower frame 5 are ring support members 2, around which are attached at intervals, a multiplicity of rail members 4 which run down the tower frame 5 for a distance which exceeds the overall height of the bag 10 plus its projected vertical travel up and down.

For proper rigidity, these rails 4 are also attached to the tower frame 5 at intervals along their length. On each rail member 4, over all of its length, are cut or formed gear teeth, so that the rail can act as a fixed rack against moving pinion gears. These pinion gears are part of power generator pods 22 which are clamped to the rails 4 and ride up and down the rail members 4 with the vertical motion of the bag structure 10. Two generator pods 22 are illustrated, held by a rail member 4 and the inner walls 45 of the bag in the cut-out of FIG. 1. In this configuration, there is a generator pod 22 associated with each rail member 4 around the periphery of the tower 1 forming a ring, and also a number of levels of rings of generator pods, depending on the overall height of the bag structure.

Figure 8:
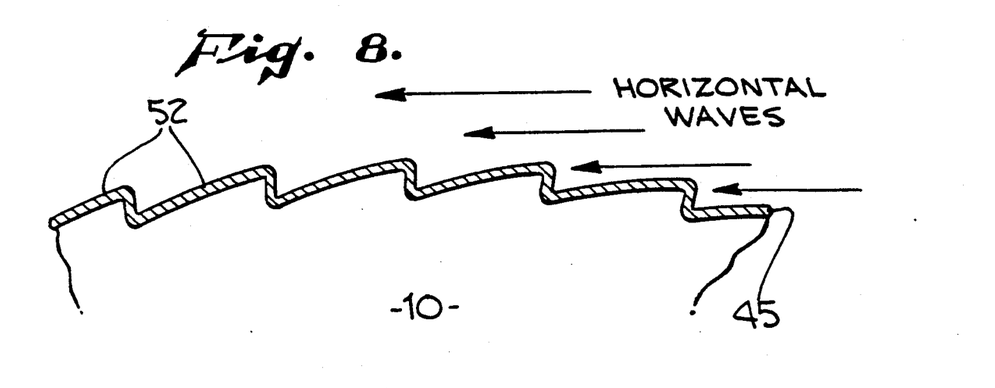
FIG. 8 is a top view of a section of the outer wall of the bag showing its shape and how horizontal waves impinge upon the wall.

The bag structure 10 is a large nylon bag which is cylindrical and further shaped to form an impeller (See FIG. 8), in order to induce rotary motion counter clock-wise when impacted by horizontal wave motion. Accordingly, the user is advised to make the surfaces 52 of outer bag wall 45 as smooth as possible to minimize resistance to counter-clockwise motion. The bag 10 is not subdivided by inner walls. At the center of the bag is constructed a vertical core which fits over the tower frame 5 and rail members 4 with clearance, forming the inside walls of the impeller permitting the bag 10 to rotate about and ride up and down the tower 1. It is expected that as much of the structure material as possible will be formed of plastic sheeting. This is because of its light weight and its resistance to corrosion by sea water.

The bag 10 is filled with compressed sea water in order to stiffen the walls of the bag. There is a pressure valve 9 located at the top of the bag to be used for pressurization, possibly utilizing a compressor on a ship.

Supported around the inside tube or core of the bag are a multiplicity of generator pods 22. Depending on the selected size of the system, there may be as many as twelve generator pods in a row around the tower 1 circumference, matching twelve rail members. If the bag structure height is selected as sixty-five meters, approximately twelve to thirteen rows of generator pods could be comfortably accommodated up and down the inside core for a total of 153 generator pods for our example to be discussed below. Each generator pod 22 contains two generator/rectifier sets 24; one for vertical motion and the other for horizontal rotation engendered by the undersea wave action.

Figure 2:
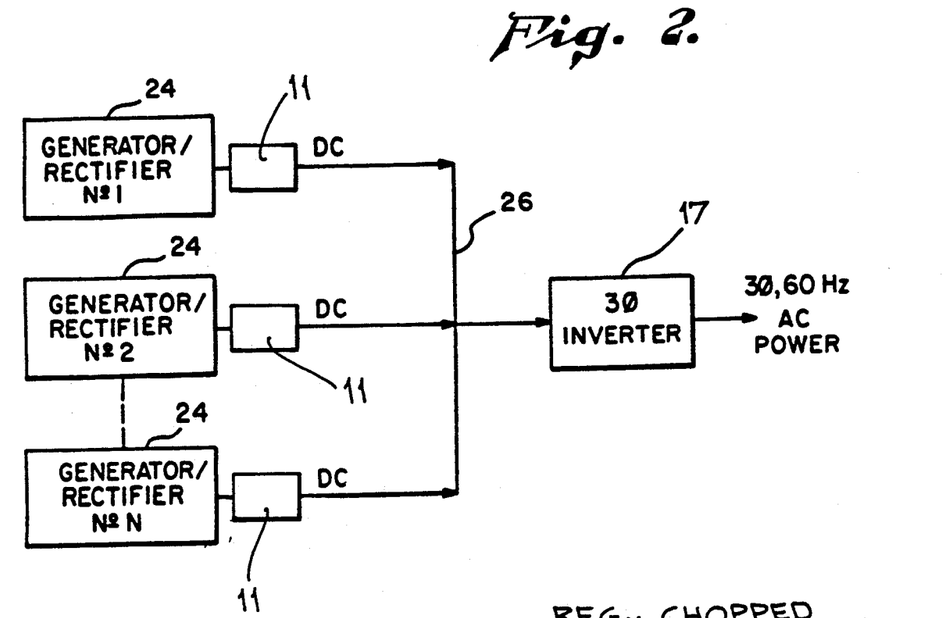
FIG. 2 is a block diagram of the electrical system of the present invention.

As shown in the simplified block diagram of FIG. 2, the DC output power of each of the generator/rectifier/chopper sets 24 is combined on a power bus 26 and transmitted by cable up to a 3-phase AC, 60 HZ inverter 17 located on a platform 13 at the top of the tower 1, from where it can be transmitted to the shore by cable 18. For a large number of generator/rectifier sets producing DC power, a multiple number of 60 HZ invertors would be required for practical system size consideration.

Each generator/rectifier set 24 is protected from power feedback from the bus 26 when it is not producing power output by a protective device 11. This permits many generator/rectifier sets to be hooked up in parallel output.

Figure 3:
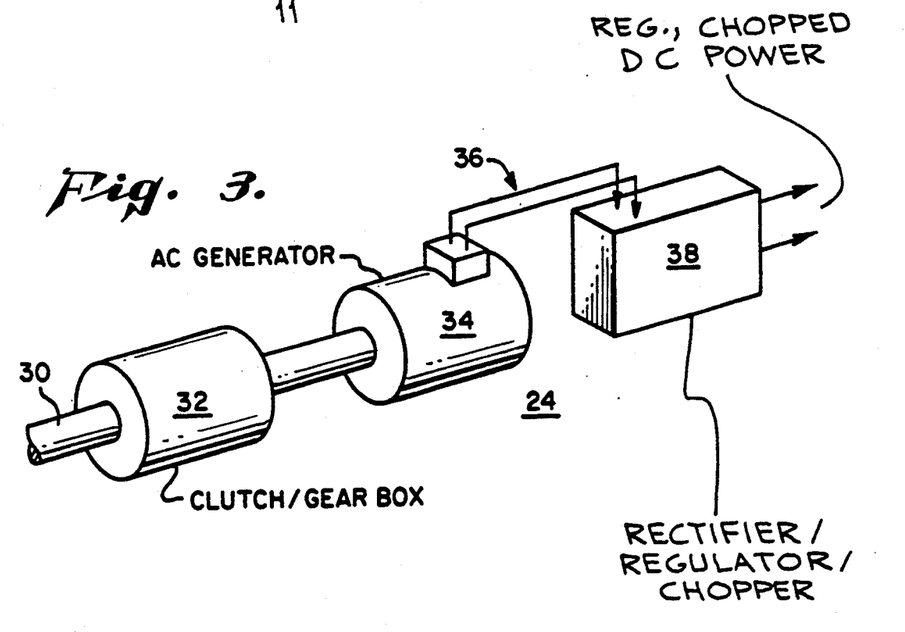
FIG. 3 is a representation of the components of a generator/rectifier/regulator, which is a basic unit of the electrical system.

FIG. 3 shows the components of a generator/rectifier set 24 which are connected to an input shaft 30. These are a clutch/gear box 32, an AC generator 34, cabling 36, and a rectifier/regulator/chopper 38. The clutch/gear box 32 engages the shaft 30 and gears up the shaft speed by a desired ratio for output to drive the generator 34. The rectifier/regulator/chopper 38 rectifies the generator AC output to a high, regulated and chopped voltage for paralleling with others at the output bus.

Figure 4:
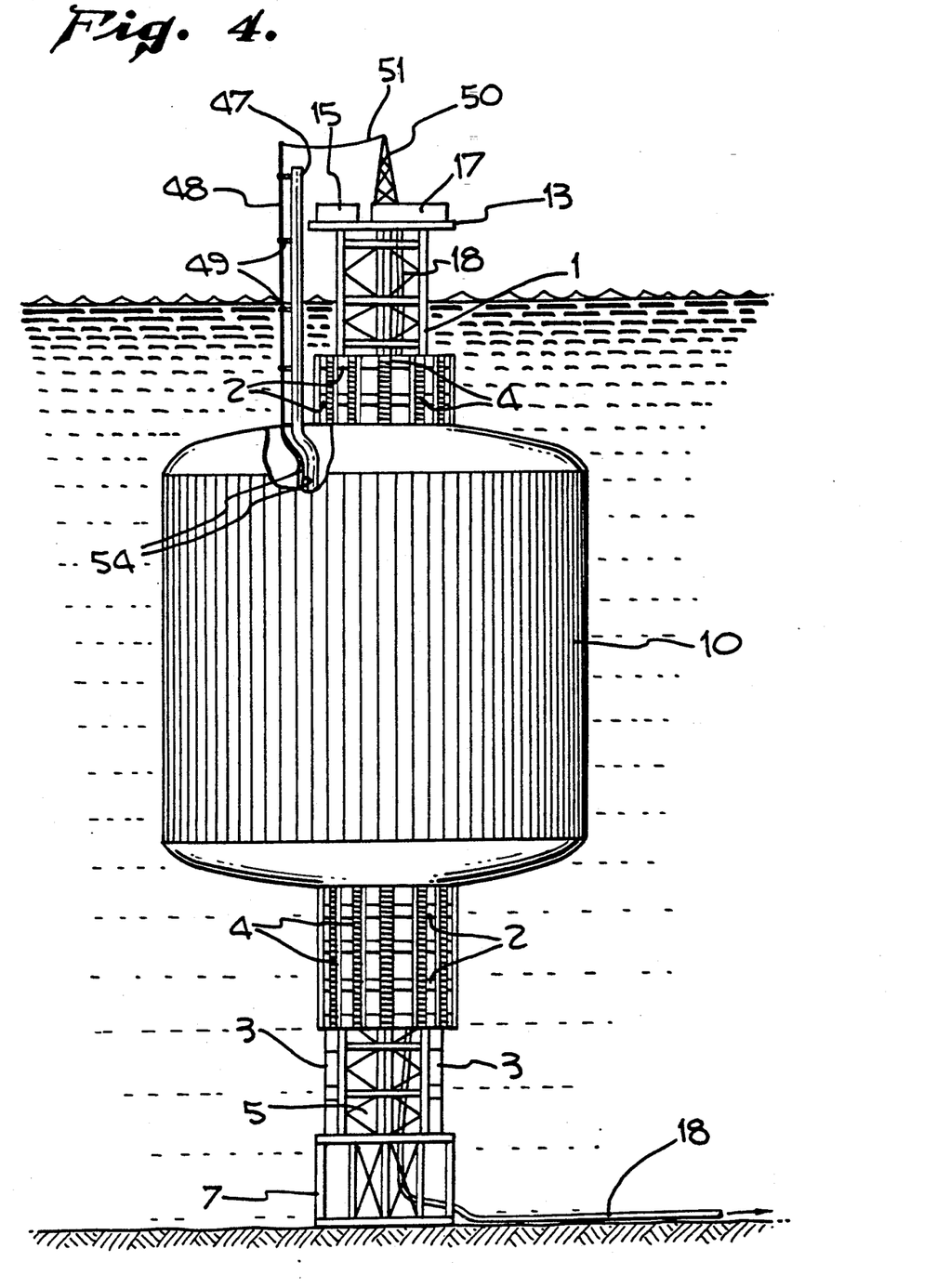
FIG. 4 is an elevation view of a prior art tower which would be suitable for adaptation to support the bag and generators of the present invention.

In order to extract the maximum power from powerful undersea waves which occur at all depths in coastal water, it is necessary to use a support tower that can stand in depths of 300 meters or more. Such a support tower is illustrated in FIG. 4.

The tower 1 is modeled after a 'Delta Tower' design which is described in a paper entitled "The Delta Tower: A Light, Compliant Tower for the Gulf of Mexico" by L. des Deserts and A. J. Cortez, presented at the 22nd Annual Offshore Technology Conference in Houston, Tex., May 7–10, 1990.

The above technical paper is hereby incorporated in this specification by reference thereto.

The Delta Tower type construction is suited for the system support tower 1 function because it has straight, vertical legs and can be used for much greater sea depths than the standard familiar 'fixed jacket' type of tower used in oil well drilling applications.

For this invention, it is intended to install the vertical rail members 4 attached to the tower frame 5 by a circular ring support 2, which holds the rail members around the periphery of the tower at a short distance off the frame.

Thus, the vertical movement of the bag 10 (in FIG. 1) up and down the rail members 4 will not encounter interferences from the tower axial tubes 3 of a Delta Tower.

Figure 5:
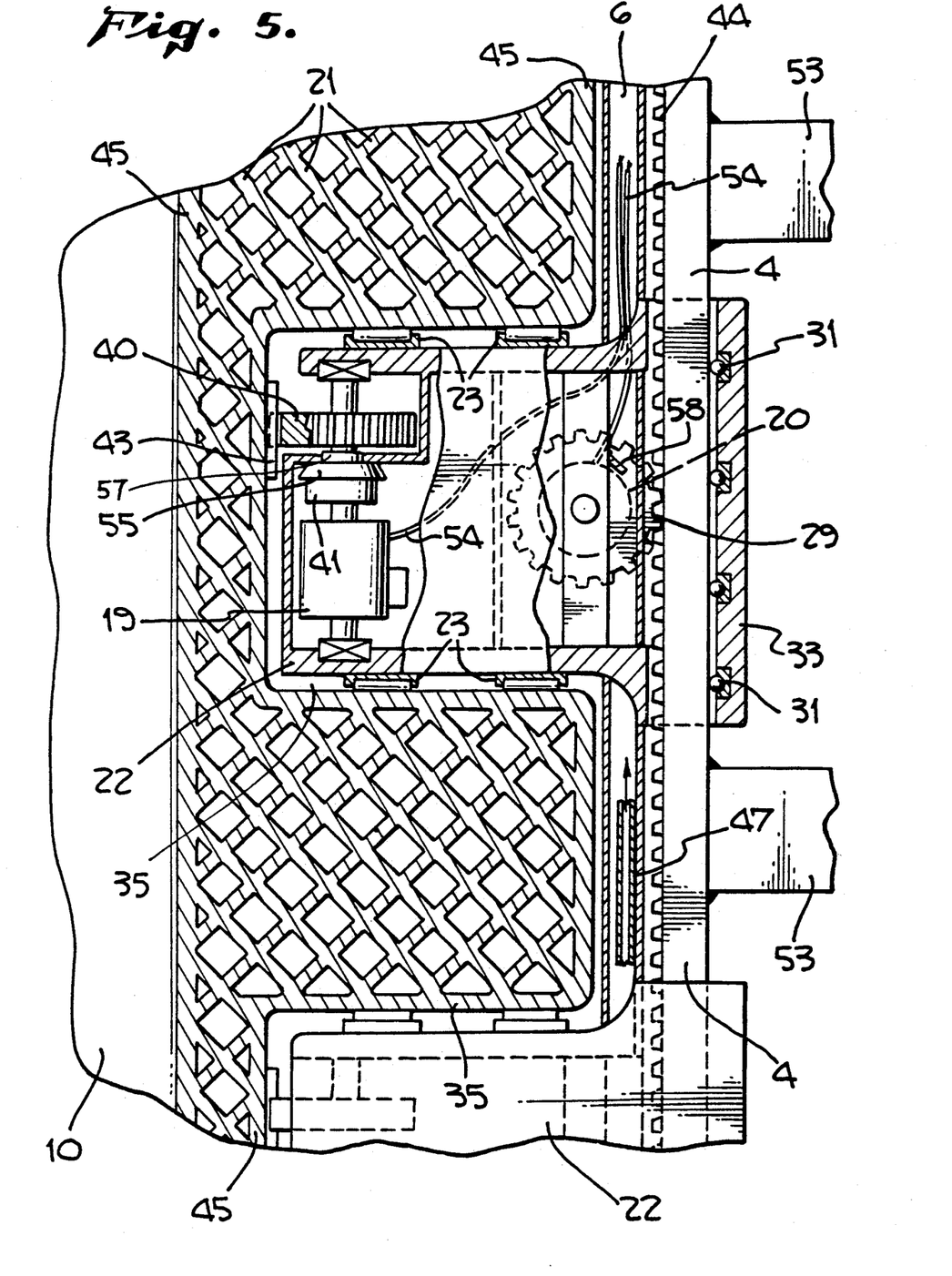
FIG. 5 is a partially cut-away elevation view of one of the power generator pods and part of the bag, particularly showing how the pod is supported by the inner walls of the bag, and also by a tower rail on which it moves vertically and rotates a generator wheel.
Figure 6:
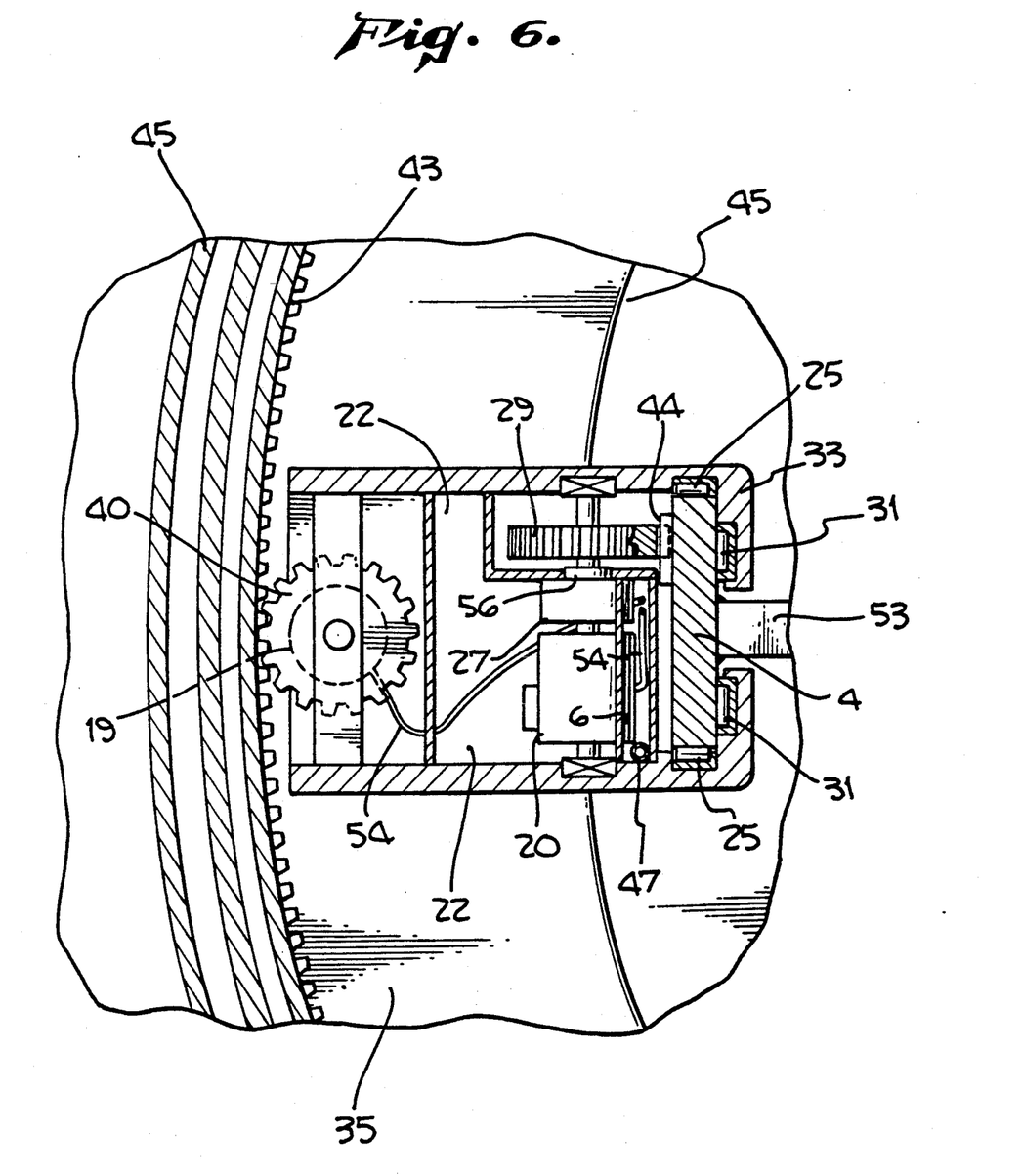
FIG. 6 is a partially cut-away plan view of one of the power generator pods and part of a bag, particularly showing the interaction of the pod horizontal generator wheel with a rack as the bag rotates about the generator.

Referring now to FIGS. 5 and 6, there is shown detail of a typical generator pod 22 and how it is supported by a rail member 4 and the bag 10. FIG. 5 is a partially cut away side elevation view, while FIG. 6 is a cut-away top view of a generator pod 22.

Referring to FIG. 5, it is seen that the central core wall 45 of the bag 10 is shaped with recesses 35 which encircle the circumference. Multiple recesses 35 are located up and down the height of the bag 10 core, each separated by two or three meters and forming a cylindrical grooved surface. These recesses 35 or grooves provide a channel for the bag 10 to rotate about the generator pods 22, and a means of retaining them and applying pressure as the bag 10 moves up and down the tower.

The wall 45 of bag 10 core is made of rigid plastic material and is supported in shape by internal air pocket-defining cross-members 21. This is necessary to maintain the square cross section of each recess 35 and support the generator pods 22. The trapped air offsets the mass of the bag 10 and generator pods 22.

Each generator pod 22 frame is made of rigid metal, having a rectangular box configuration with one end formed in a clamp 33 around the rail member 4, including clearance for movement up and down the rail member 4. Multiple roller bearings 23 are attached to the top and bottom surfaces of the pod frame to support the pod as it interacts with the upper and lower wall surfaces of a recess 35 in the bag 10. Multiple roller bearings 25, 31 are also installed on the inside of the clamp 33 portion to bear against the back and two sides of the rail member 4 which is attached to the ring 2 by support member 53.

There are two generators 19, 20 per pod; one for generating power from the horizontal rotation of the bag 10, and the other for the bag 10 vertical motion. The horizontal rotation generating equipment is supported in vertical position in the pod frame 22 near its open end, distal the clamp 33 and rail member 4 end. In addition to a shaft, it comprises a pinion gear 40, a clutch/gear box 41, an AC alternator 19 and a rectifier/regulator which is partially illustrated attached to the alternator. The pinion gear 40 meshes with a continuous rack 43 which is mounted on the inside wall of the bag-structure recess 35.

As the bag 10 rotates in response to wave action, the rack 43 on each recess wall rotates at the same time, causing the pinion gear 40 to turn. The clutch/gear box 41 speeds up the rotation rate of the pinion gear 40 and applies the higher speed shaft to the alternator 19 which produces AC power for rectification by the rectifier/regulator.

The vertical motion generating equipment 20 is supported horizontally by the pod frame 22 near the clamp 33 end of the pod. It is exactly the same as the horizontal motion generating equipment and comprises, in addition to a drive shaft, a pinion gear 29, a clutch/gear box 27, an AC alternator 20, and a regulator/rectifier/chopper.

Mounted vertically on each rail member 4 is a continuous rack 44 which meshes with the generator set pinion gear 29, causing the gear 29 to rotate as the bag 10 and the generator pod 22 move up and down with the wave action. Rotation of the gear 29 is transmitted through the clutch/gear box 27 to the alternator 20, generating AC power for rectification and chopping.

It should be noted that the clutch/gear box 27 functions in this case to permit rotation only in one direction, as required for producing AC power. This can be made to correspond to upward pod motion only or downward motion only. To obtain the maximum power output from the system, it is expected that half the vertical motion generator sets would be rigged for upward motion, and the other half for downward motion, thus accommodating the full wave velocities.

On the horizontal generator set, the normal rotary motion is always in one direction, counter-clockwise. However, in the unlikely event that this motion reverses momentarily, the clutch/gear box 41 will prevent reverse rotation of the AC alternator.

In practice, it will be found there is some water leakage through seals 57 and 56 which separate the air-filled generator compartments from the ocean outside it. This problem is handled in the following way: water leaks through seals 57 and falls over splash guard 55 positioned to protect generator 19, or through seal 56. In either case, the leakage eventually falls through opening 6, which is an air shaft connecting succeeding generator compartment levels. The leakage is pumped back up opening 6 by pump 46 (see FIG. 1). Referring to FIGS. 1, 4, we see this leakage is eventually to be pumped through pipe 47 where it discharges above the ocean surface. Opening 6 should be internally braced as needed.

Power from generators 19, 20 is taken off by cables 54 through opening 6 to the top of bag 10 and then (see FIG. 1), up an insulated wire in a mast 48 connected by suitable means 49 to pipe 47. The pipe 47 is affixed to the bag and moves vertically as well as rotates in the horizontal dimension with the bag. By cable 51, the electric output is transferred through a rotatable fixture to mast 50 located on the central axis of support tower 5. The output is converted to AC by inverter 17 and sent on by cable 18 to the coast.

Figure 7:
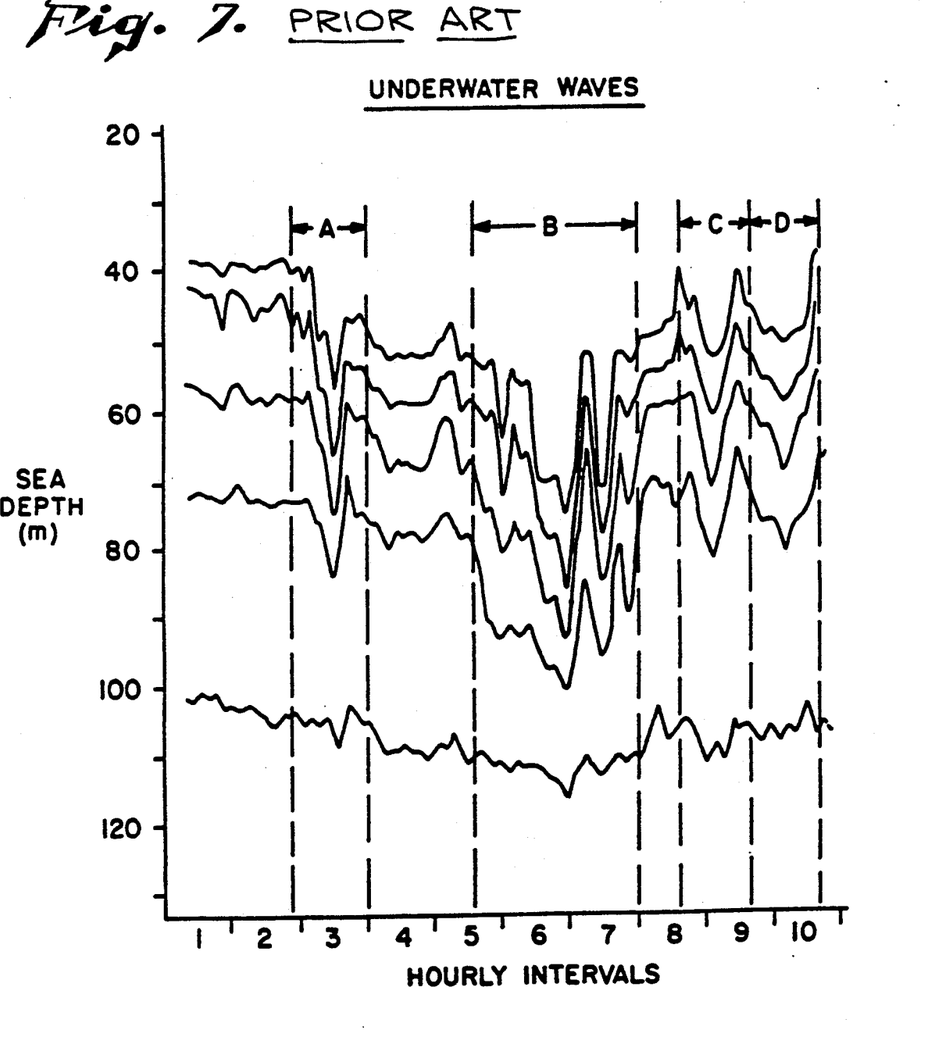
FIG. 7 is a copy of part of a chart from a study paper plotting underwater wave oscillations off the California coast, and particularly useful in illustrating the range of movement and depth of the underwater waves which may be used to drive the generator system of the present invention.

Thomas L. Howell and Wendell S. Brown of the University of New Hampshire have studied and reported on nonlinear internal (undersea) waves in a paper entitled "Nonlinear Internal Waves on the California Continental Shelf", published in the Journal of Geophysical Research, 1985. FIG. 7 is a plot of underwater waves (isopycnal depths) taken from the above paper and annotated for reference. Events A, C and D are normal large vertical wave oscillations, with event B being exceptionally large. From the plot, it is seen that the waves exist from about 40 meters depth down to below 100 meters depth.

The average vertical velocity of the waves is 0.0089 meters/second, whereas the average horizontal velocity is 0.05 meters/second. Thus the horizontal production of applied wave force to the bag structure system is more than five times that of the vertical production. To take advantage of this relationship, it is possible that the horizontal rotation generator sets might be made five times more powerful than the vertical motion generator sets. However, the occasional occurrence of deep, relative high vertical velocity events such as shown in events A, B and C in FIG. 7 tends to even the vertical and horizontal wave power contributions, so that it is probably desirable to keep the horizontal and vertical generator sets at about the same rating. This question would be settled by studies of the undersea non-linear waves to be conducted in the continental shelf area where the invention system is to be erected.

From the foregoing description, it is seen that multiple generator sets will be driven by the horizontal rotation of the bag 10. An equal number of generator sets will be driven by the vertical motion of the bag 10.

Let us say that the bag 10 is 65 meters diameter and is 65 meters deep, with a vertical core hole of approximately 19.8 meters diameter. The volume of the bags is about 195,576 cubic meters due to the impeller shape. The amount of sea water to fill this volume is 195,576,870 kg. or 430,269,110 lbs and minimal extra for compression. Thus, a tremendous amount of kinetic energy is available.

The proposed machine, which the invention constitutes, is very large because the internal waves from which the machine extracts its energy are weak relative to ocean surface waves. The size is offset by the advantage of not having to contend with rough surface waves as may often occur with the surface floating generator systems discussed in the introduction. Further, it is anticipated that the overall system cost per kilowatt-hour produced will be low compared with other projected sea wave electric generator systems.

Use of a "Delta Tower" type supporting construction permits installation of the system in depths of 500 meters or more, allowing the power generating system to be combined with a drilling rig if so desired. The great permissible depth of the installation also permits the system to be installed at a distance well offshore.

Maintenance access to the generator pods would be through the center of the 19.8 meter diameter tower structure. A maintenance facility 15 may be installed on the platform 13.

Output may be sporadic, so an electric storage system may be needed ashore (batteries, pumped storage, etc.).

A major difference here is the absence of potential pollution from the proposed system installation. This should make it a welcome addition to offshore power generating systems.

From the above description, it is apparent that the preferred embodiment achieves the objects of the present invention. Alternative embodiments and various modifications of the depicted embodiment will be apparent from the above description to those skills in the art. These and other alternatives are considered to be equivalent and within the spirit and scope of the present invention.

Having described the invention, what is claimed is:

1. A system for generating electrical power from the motion of undersea waves, the system comprising:
    (a) A tower, having multiple portions adapted to support a large external structure underwater;
    (b) A bag which is large and cylindrically shaped, supported centrally by said tower; said bag being internally stiffened by compressed water to maintain its shape, and configured to produce rotational motion and vertical motion with respect to said tower when impacted by undersea waves;
    (c) Means interconnecting said tower and said bag, permitting said bag to move with respect to said tower;
    (d) A multiplicity of power generator pods retained by said bag; said power generator pods disposed with pinion gears which interact with said tower support portions and with portions of said bag; said pinion gears operatively connected to generator/rectifier/chopper sets which produce DC electric power; and
    (e) A multiplicity of output power AC invertors mounted on said tower to convert said DC electric power to AC power for transmission to the shore.

2. A system as in claim 1 wherein said multiple portions of said tower define rail members attached to the periphery of said tower frame, said rail members extending downward from the top of said tower at separated locations.

3. A system as in claim 2 wherein said rail members have a rack gear portion installed along their length on their outward facing surface; said rack gear portion for the purpose of interfacing with said pinion gears of said power generating pods to generate power.

4. A system as in claim 1 wherein said tower comprises a rectangular section frame with straight, vertical sides for its full length and a fixed base at said tower bottom, said tower configuration being adaptable for use in supporting said bag, allowing said bag movement up and down its length, and for installation in very deep (e.g., greater than 300 meters depth) sea water 5. A system as in claim 1 wherein said bag comprises: a large, nylon bag filled with and held rigid by compressed sea water, said bag being cylindrical and having an outer surface shaped to form an impeller in order to induce rotary motion when impacted by horizontal wave motion; said bag forming at its center, a vertical tube or core having a diameter wide enough to fit over said tower and said rail members with clearance; said core wall being formed with multiple divided horizontal recesses up and down the height of the structure, each said recess extending continuously around the circumference of said core and having a rectangular cross-section, forming a shelf; said recesses consisting of subdividing structures to maintain rigidity and enclosing air pockets to maintain buoyancy of said bag and offset the mass of the said power generator pods; said recesses providing a means of retaining said power generator pods; each said recess having a continuous circumferential drive rack affixed to its inmost vertical wall for the purpose of providing drive to said power generator pods resulting from the rotational motion of said bag structure.

6. A system as in claim 1 wherein said power generator pods each comprise a rigid metal frame, two generator/rectifier/regulator sets secured and supported by said frame and multiple roller bearings attached to said frame; said frame having a box configuration, with one end formed in a vertical clamp around said tower rail member; each said generator/rectifier/regulator set comprising a pinion gear operatively connected by shaft to a clutch/gear box, an AC alternator operatively connected by shaft to said clutch/gear box, and a rectifier/regulator/chopper connected by wire to said AC alternator; one said generator/rectifier set being mounted in said frame horizontally near said clamp end, and fixed in a location to ensure its pinion gear will mesh with said rack on a tower vertical rail member, the second generator/rectifier/chopper set being mounted in said frame vertically at near its open end distal said clamp, and fixed in a location to ensure its pinion gear will mesh with said continuous circumferential drive rack in a central core recess of said bag structure;

said generator/rectifier/chopper sets and clutch/gear boxes in each said pod isolated from the surrounding ocean by walls of said pod and connected to adjacent levels of pods by connecting air shafts to facilitate power take off and leaking water removal;

said roller bearings being attached to said generator pod frame at locations to interact with the upper and lower surfaces of said central core recess; said roller bearings also being attached to said generator pod frame, mounted inside said clamp and located to bear against three sides of a vertical rail member when said pod is assembled in place; said roller bearings on said pod frame and clamp permitting said bag structure to rotate with respect to each said generator pod and said tower while simultaneously engaging its horizontal motion pinion gear, and permitting each said generator pod to move vertically up and down a rail member while simultaneously engaging its vertical motion pinion gear;

said pinion gears in each said generator/rectifier/chopper set, being driven by the motion of said bag in rotation and vertical movement due to impinging undersea waves, and causing each said generator/rectifier/chopper set to produce electric power.

7. A system as in claim 1 wherein said system is in combination with an onshore storage battery.

8. A system as in claim 1 wherein said system is in combination with an onshore pumped storage system.

* * * * *